United States Patent
Chung et al.

(10) Patent No.: US 12,526,251 B2
(45) Date of Patent: Jan. 13, 2026

(54) SYSTEM AND METHOD FOR VALIDATION OF REPRESENTATIVE LINKS IN MESSAGES

(71) Applicant: VERIZON PATENT AND LICENSING INC., Basking Ridge, NJ (US)

(72) Inventors: Jae ho Chung, East Brunswick, NJ (US); Yuk Lun Li, Morganville, NJ (US); Lisa Devito, Whitehouse Station, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 445 days.

(21) Appl. No.: 18/156,026

(22) Filed: Jan. 18, 2023

(65) Prior Publication Data

US 2024/0244018 A1      Jul. 18, 2024

(51) Int. Cl.
*H04L 51/07* (2022.01)
*G06F 16/955* (2019.01)

(52) U.S. Cl.
CPC ............ *H04L 51/07* (2022.05); *G06F 16/955* (2019.01)

(58) Field of Classification Search
CPC ............................... H04L 51/07; G06F 16/955
USPC ....................................................... 709/206
See application file for complete search history.

(56) References Cited

U.S. PATENT DOCUMENTS

| | | | |
|---|---|---|---|
| 11,646,988 B2* | 5/2023 | Murphy | H04L 51/224 709/206 |
| 11,741,095 B2* | 8/2023 | Purre | H04L 67/535 707/737 |
| 2003/0097410 A1* | 5/2003 | Atkins | H04L 61/30 709/204 |
| 2007/0016613 A1* | 1/2007 | Foresti | G06Q 10/107 |
| 2007/0078936 A1* | 4/2007 | Quinlan | G06Q 10/107 709/206 |
| 2009/0313333 A1* | 12/2009 | Fanebost | G06Q 10/107 709/206 |
| 2014/0344373 A1* | 11/2014 | Bastide | H04L 51/08 709/206 |
| 2016/0036971 A1* | 2/2016 | Velthuis | H04L 51/212 455/466 |
| 2017/0237822 A1* | 8/2017 | Kahn | H04L 67/561 709/206 |
| 2022/0021647 A1* | 1/2022 | Cai | H04L 67/51 |

(Continued)

*Primary Examiner* — Anthony Mejia

(57) ABSTRACT

In the various embodiments, systems and methods are disclosed for sending messages with validated representative links from entities to users on a network. In some embodiments, a message originator can interface with an A2P platform of a message aggregator server to upload a message template including message content and an Internet link. In some embodiments, the A2P platform can obtain a representative link corresponding to the Internet link from a representative link server. In some embodiments, the A2P platform can compile a message including the representative link and other information from the message template. In some embodiments, the A2P module can provide the compiled message to a messaging module of the message aggregator server. In some embodiments, the messaging module can communicate with the representative link server to validate the representative link and, if valid, transmit the compiled message to a messaging server of the network.

20 Claims, 5 Drawing Sheets

(56) References Cited

U.S. PATENT DOCUMENTS

2022/0261232 A1\* 8/2022 Knight .................... H04W 4/14
2023/0262427 A1\* 8/2023 Mumick ................. H04L 51/10
　　　　　　　　　　　　　　　　　　　　　　455/466

\* cited by examiner

SYSTEM AND METHOD FOR VALIDATION OF REPRESENTATIVE LINKS IN MESSAGES

BACKGROUND

Current communications networks allow for the exchange of messages including links to websites or other networked resources. Because such links can be convoluted and take up valuable message space, shorter, representative links can be used instead. Such functionality, however, allows malicious actors to conduct phishing attacks on users by impersonating messages from legitimate entities with links that seem legitimate but, in fact, redirect the user towards malicious sites.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
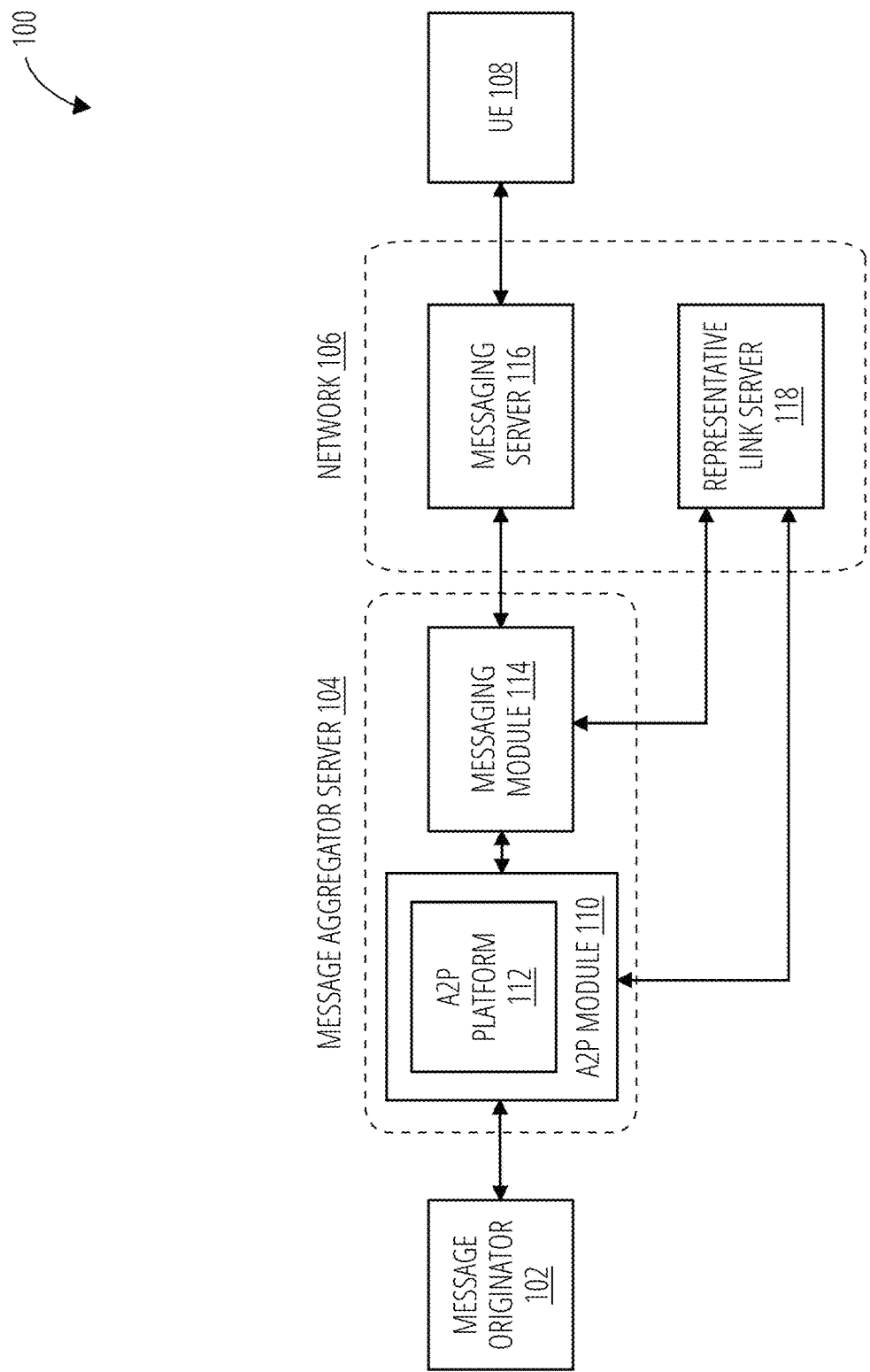
FIG. 1 is a block diagram of an example environment within which the systems and methods disclosed herein could be implemented according to an embodiment.

Due to privacy concerns telecommunications network operators (NOs) do not screen messages for malicious links or any other type of content. As such, telecom networks might be exploited to reach large numbers of vulnerable users. For example, a phishing attack can involve a malicious actor spoofing or otherwise replacing legitimate links or representative links with similar links (often by changing a letter or replacing letters with numbers) in a message (e.g., a Short Message Service (SMS) message) that seems to come from a legitimate entity. An unsuspecting user may then interact with the link which can expose the user's device and/or data to the malicious actor. Like legitimate entities, malicious actors may rely on Application-to-Person (A2P) SMS systems to send out mass messages containing malicious links.

In the various embodiments, systems and methods are disclosed for sending messages with validated representative links from message originators to users on telecommunications networks. In some embodiments, a message originator can interface with an A2P platform implemented on an A2P module of a message aggregator server (or message aggregator) to upload a message template including message content and an Internet link. In some embodiments, the A2P module can obtain a representative link corresponding to the Internet link from a representative link server. In some embodiments, the A2P module can compile a message including the representative link and other information from the message template. Then, in some embodiments, the A2P module can provide the compiled message to a messaging module of the message aggregator server. In some embodiments, the messaging module can communicate with the representative link server to validate the representative link and, if valid, transmit the compiled message to a messaging server of the network to be forwarded to a User Equipment (UE) of the user.

In some aspects, the techniques described herein relate to a method including receiving, by a message aggregator server, a message template including an Internet link; obtaining a representative link corresponding to the Internet link; compiling a message based on the message template and the representative link, the compiled message including the representative link; validating the representative link; and transmitting based on whether the representative link is valid, the compiled message including the representative link.

In some aspects, the Internet link can be a Uniform Resource Locator (URL) link. In some aspects, the compiled message can be an SMS message.

In some aspects, the method can include obtaining the representative link by transmitting, to a representative link server, a request to provide the representative link, the request including the Internet link; and receiving, from the representative link server, the representative link.

In some aspects, the method can include validating the representative link by transmitting, to the representative link server, a request to indicate whether the representative link is valid; and receiving, from the representative link server, a response indicating that representative link is valid.

In some aspects, the representative link can be obtained from a representative link server corresponding to a telecommunications network. In some aspects, the representative link can be specific to the network. In some aspects, the method can include transmitting, to a messaging server of the network, the compiled message with the representative link.

In some aspects, the techniques described herein relate to a non-transitory computer-readable storage medium for storing instructions executable by a processor, the instructions comprising receiving a message template including an Internet link; obtaining a representative link corresponding to the Internet link; compiling a message based on the message template and the representative link, the compiled message including the representative link; validating the representative link; and transmitting, based on whether the representative link is valid, the compiled message including the representative link.

In some aspects, the techniques described herein relate to a device comprising a processor configured to receive a message template including an Internet link; obtain a representative link corresponding to the Internet link; compile a message based on the message template and the representative link, the compiled message including the representative link; validate the representative link; and transmit, based on whether the representative link is valid, the compiled message including the representative link.

FIG. 1 is a block diagram of an example messaging environment within which the systems and methods disclosed herein could be implemented according to an embodiment.

According to some embodiments, a messaging environment 100 can include a message originator 102, a message aggregator server 104, a network 106, a UE 108, and a representative link server 118. In some embodiments, message originator 102 can interact with message aggregator server 104 to register an Internet link with representative link server 118 and obtain a representative link associated with the Internet link. In some embodiments, the message originator 102 can interact with message aggregator server 104 to prepare and send a message including the representative link to UE 108 via network 106.

In some embodiments, message aggregator server 104 can communicate with representative link server 118 to verify a representative link included in a message to be sent to UE 108 through network 106. In some embodiments, message aggregator server 104 can include an A2P module 110 implementing an A2P platform 112 for receiving input from and providing feedback to message originator 102. In some embodiments, message aggregator server 104 can include a messaging module 114 for managing message transmission and representative link verification.

In some embodiments, a message originator 102 can be a company, advertiser, nonprofit organization, governmental organization, or other entity that may communicate with users of a network through messages. In some embodiments, an agent of message originator 102 can interact with the A2P platform 112 to request and obtain a representative link. In some embodiments, the agent can interact with A2P platform 112 to prepare and send one or more messages to one or more UEs 108 associated with network users. In some embodiments, A2P platform 112 can be a centralized platform that allow entities (e.g., message originator 102) to prepare and send messages to large numbers of users without having to individually prepare and send each message from a UE operated by entity to the UE 108 of each users.

In some embodiments, an A2P platform 112 can include a web portal within which the agent of the message originator 102 can upload a message template to be sent to UE 108. In some of those embodiments, A2P module 110 can act as a web server to host the A2P platform 112. In some embodiments, the web portal can allow the agent to obtain representative links, upload message templates, identify representative links to be included, identify recipients or set of recipients to which the messages are to be sent, and or specify other characteristics of the messages.

In some embodiments, A2P platform 112 can include an Application Programing Interface (API) through which the message originator 102 can communicate with the A2P module 110. In some embodiments, a message template can include message content (e.g., text) and Internet links. In some embodiments, a message template can include message metadata or other message parameters of the message to be sent. For example, in some embodiments, the message template can include recipient identifiers (e.g., phone numbers), send by dates and times, formatting, and/or any other parameters associated with messages sent over telecommunications networks.

In some embodiments, the message templates can include Internet links to webpages or other connected resources—herein referred to as a link. In some embodiments, the webpages or connected resources can be associated with the message originator 102 (e.g., a company's website or a link to download an application or program). In some embodiments, the Internet link can be a Uniform Resource Locator (URL) link.

In some embodiments, the A2P module 110 can automatically communicate with representative link server 118 to obtain a representative link associated with an original link provided by the message originator 102. In some embodiments, A2P module 110 can automatically replace the Internet link provided by the message originator 102 in the message template with the representative link. In some embodiments, message originator 102 may have obtained a representative link through the A2P module 110 prior to uploading a message template (e.g., as described in relation to FIG. 3). In some of those embodiments, the uploaded message template can include the representative link previously obtained by the message originator 102.

In some embodiments, a representative link can be shorter (e.g., less characters) than an associated original link. In some embodiments, a representative link can be a shortened version of the original link. In some embodiments, a representative link can be a URL link.

In some embodiments, representative link server 118 can act as registration server to register original Internet links provided by message originators 102 through message aggregator server 104. In that capacity, representative link server 118 can generate a corresponding representative link associated with the original link, and provide said representative link to the message aggregator server 104. In some embodiments, representative link server 118 can automatically check, prior to registering the Internet link, whether the original Internet link provided by message originator 102 is a legitimate link corresponding to safe webpages or resources. In some embodiments, representative link server 118 can determine that a provided Internet link is malicious or controlled by malicious actors.

In some embodiments, representative link server 118 can act as a verification server to verify whether a representative link is valid or invalid. For example, in some embodiments, messaging module 114 of message aggregator server 104 can query representative link server 118 to validate a representative link (e.g., determine whether it is legitimate and/or registered) in a message to be sent to a UE. In some embodiments, representative link server 118 can maintain a list of links and corresponding, valid, representative links. In some embodiments, representative link server 118 can maintain an allow-list of links. In some embodiments, the allow-list can include verified or authorized Internet links and/or corresponding representative links. In some embodiments, representative link server 118 can maintain a deny-list of links. In some embodiments, the deny-list can include Internet links and/or representative links that have been deemed to be malicious or otherwise restricted.

As illustrated, in some embodiments, representative link server 118 can be part of network 106. In some embodiments, the representative links can be unique to or can only be resolved by network elements of network 106. In that sense, representative links can be said to be network specific. In some of those embodiments, A2P module 110 can determine the network that services the intended recipient and contact the specific representative link server associated with the network. In some embodiments, representative link server 118 can be a third-party server independent of network 106.

According to some embodiments, at runtime, a UE 108 can send a request to the network 106 to access a webpage or resource associated with a representative link included in a message received by UE 108. In some of those embodiments, the representative link server 118 can reroute the UE's 108 request to the original link. In some other embodiments, a network element of network 106 (or of a data network connected to network 106) handling the request from UE 108 can communicate with representative link server 118 to obtain the original link and reroute the request to the original link.

Returning to FIG. 1, in some embodiments, A2P module 110 can compile a message from the message template provided by the message originator 102 and the representative link obtained from representative link server 118. In some embodiments, A2P module 110 can provide the compiled message to messaging module 114 of message aggregator server 104 to be sent to messaging server 116 of network 106. In some embodiments, the compiled message can be an SMS message. In some embodiments, the compiled message can be any type of message transmitted through a telecommunications network.

In some embodiments, prior to sending the compiled message, messaging module 114 can communicate with representative link server 118 to confirm that the representative link included in the message is valid or legitimate. In some embodiments, based on the response from the representative link server 118, messaging module 114 can embed the message data or metadata with a validation flag indicating whether a representative link included in the message is valid (e.g., the representative link is on the allow-list maintained by representative link server 118). In some embodiments, after the representative link has been validated, messaging module 114 can transmit the message to messaging server 116. Then, in some embodiments, the messaging server 116 can route the received message to the appropriate UE 108. In some embodiments, messaging server 116 can check the status of the validation flag and determine whether to push the message to the UE 108 based on whether the flag is set or not.

As illustrated, in some embodiments, A2P module 110 and messaging module 114 can be implemented on the same server—message aggregator server 104. In some embodiments, message aggregator server 104 can be implemented across multiple devices. In those embodiments, A2P module 110 and messaging module 114 can be distributed across the multiple devices.

In some embodiments, messaging server 116 and representative link server 118 can be implemented on the same device or distributed across multiple devices. In some embodiments, messaging server 116 and representative link server 118 can be the same server. In some embodiments, message originator 102 and/or message aggregator server 104 can be part of a data network 408 as discussed with respect to FIG. 4. In some embodiments, network 106 can be part of an access network 404 and/or a core network 406 as discussed with respect to FIG. 4. In some embodiments, UE 108 can be a UE 402 as discussed with respect to FIG. 4.

Figure 2:
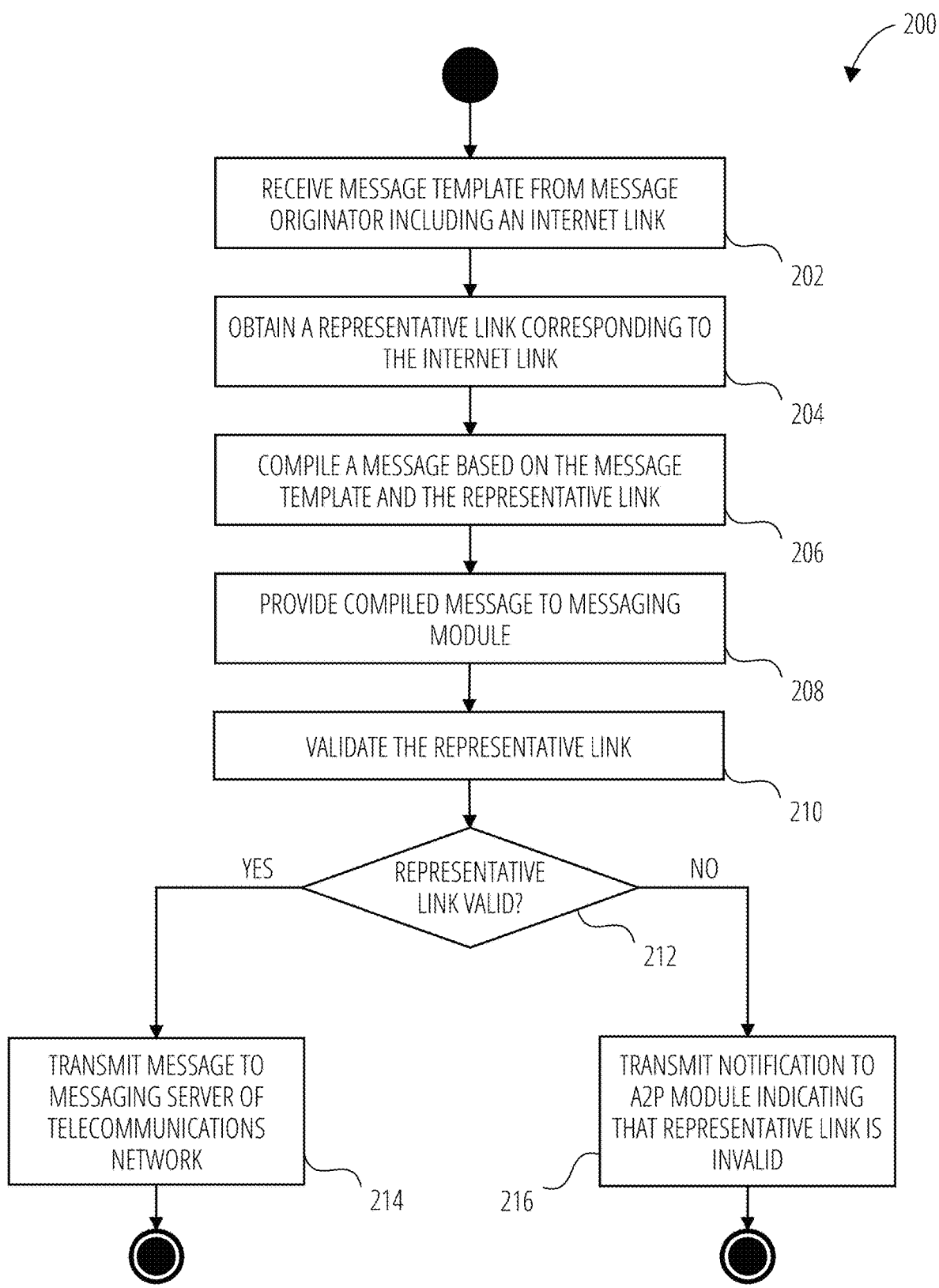
FIG. 2 is a flow diagram illustrating a method for sending a message with a validated representative link according to an embodiment.

FIG. 2 is a flow diagram illustrating a method for sending a message with a validated representative link according to an embodiment.

In Step 202, method 200 can include receiving a message template from a message originator (e.g., message originator 102). In some embodiments, the message template can be received through an A2P platform (e.g., A2P platform 112) implemented on an A2P module (e.g., A2P module 110) of a message aggregator server (e.g., message aggregator server 104).

In some embodiments, the message template can include message text, send by dates and times, recipient identifiers, and/or other message content or parameters. In some embodiments, the message template can include an Internet link to a webpage or other connected resource or a representative link associated with the Internet link.

Figure 3:
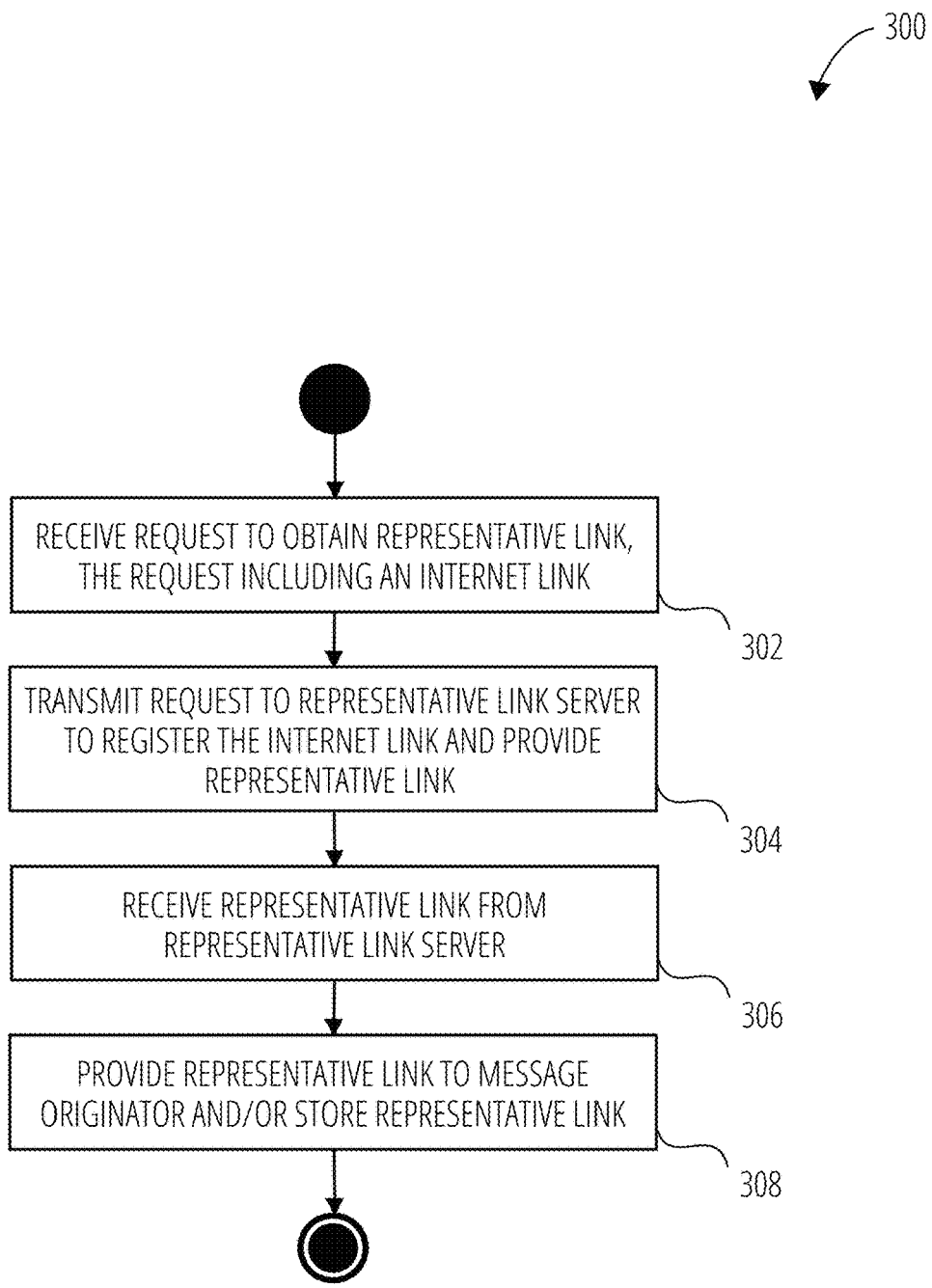
FIG. 3 is a flow diagram illustrating a method for obtaining a representative link according to an embodiment.

Optionally, in some embodiments, where the message originator had not previously obtained a representative link, in Step 204, method 200 can include obtaining a representative link corresponding to the link included in the message template (e.g., as described in Steps 304-306 of method 300 in FIG. 3).

In Step 206, method 200 can include compiling, by the A2P module, a message based on the message template and the representative link. In some embodiments, where the message is an SMS message, compiling the message can include concatenating some of the information from the message template (e.g., message text, recipient identifiers) into a string of text. In some of those embodiments, the string of text can include the representative link.

In Step 208, method 200 can include providing, by the A2P module to a messaging module (e.g., messaging module 114) of the message aggregator server, the compiled message including the representative link.

In Step 210, method 200 can include validating, by the messaging module in communications with the representative link server, the representative link included in the compiled message. In some embodiments, validating the representative link can include transmitting, by the messaging module to the representative link server, a request to indicate whether the representative link is valid and receiving, from the representative link server, a response indicating whether the representative link is valid.

In Step 212, method 200 can include determining based on the response from the representative link server that the representative link is valid or invalid. If the representative link is valid, method 200 proceeds to Step 214. In Step 214, method 200 can include transmitting the compiled message from the messaging module to a messaging server (e.g., messaging server 116) of a telecommunications network servicing an intended recipient of the compiled message. In some embodiments, in Step 214, method 200 can include setting a validation flag to indicate that a representative link included in the message has been validated. If the representative link is invalid, method 200 proceeds to Step 216. In Step 216, method 200 can include transmitting a notification to the A2P module indicating that the representative link was invalid and/or that the message was undeliverable.

FIG. 3 is a flow diagram illustrating a method for obtaining a representative link according to an embodiment.

In Step 302, method 300 can include receiving, from a message originator at an A2P platform (e.g., A2P platform 112) implemented on an A2P module (A2P module 110) of a message aggregator server (e.g., message aggregator server 104), a request to obtain a representative link. In some embodiments, the request can include an Internet link to a webpage or other connected resource. In some embodiments, the request to obtain the representative link can be part of a message template uploaded by the message originator to the A2P platform. In some embodiments, the request to obtain the representative link can be triggered by the message template upload. In those embodiments, upon receiving a message template including an Internet link, the A2P module can automatically communicate with representative link server 118 in Step 304.

In Step 304, method 300 can include transmitting, from the A2P module to a representative link server (e.g., representative link server 118), a request to register the original Internet link. In some embodiments, in Step 304, the A2P module can also transmit a request to generate and provide a representative link associated with the Internet link. In some embodiments, the representative link server can generate the representative link corresponding to the Internet link based on the request from the A2P module.

In some embodiments, the representative link can be specific to the network servicing the intended recipient of the message including the Internet link. In some of those embodiments, the request received in Step 302 can include a recipient identifier (e.g., a phone number). In some embodiments, method 300 can include, prior to Step 304, determining the appropriate network and corresponding representative link server providing link registration services for that mobile network based on the recipient identifier. Then, in Step 304, method 300 can include sending the request to provide the representative link to the identified representative link server.

In Step 306, method 300 can include receiving, from the representative link server, the generated representative link.

In Step 308, method 300 can include providing the representative link to the message originator to be used on future message templates. In some embodiments, where the request to obtain the representative link stems from a message template upload, the A2P module can add the received representative link to the message template. In some embodiments, A2P module can store the representative link for use in future message templates.

Figure 4:
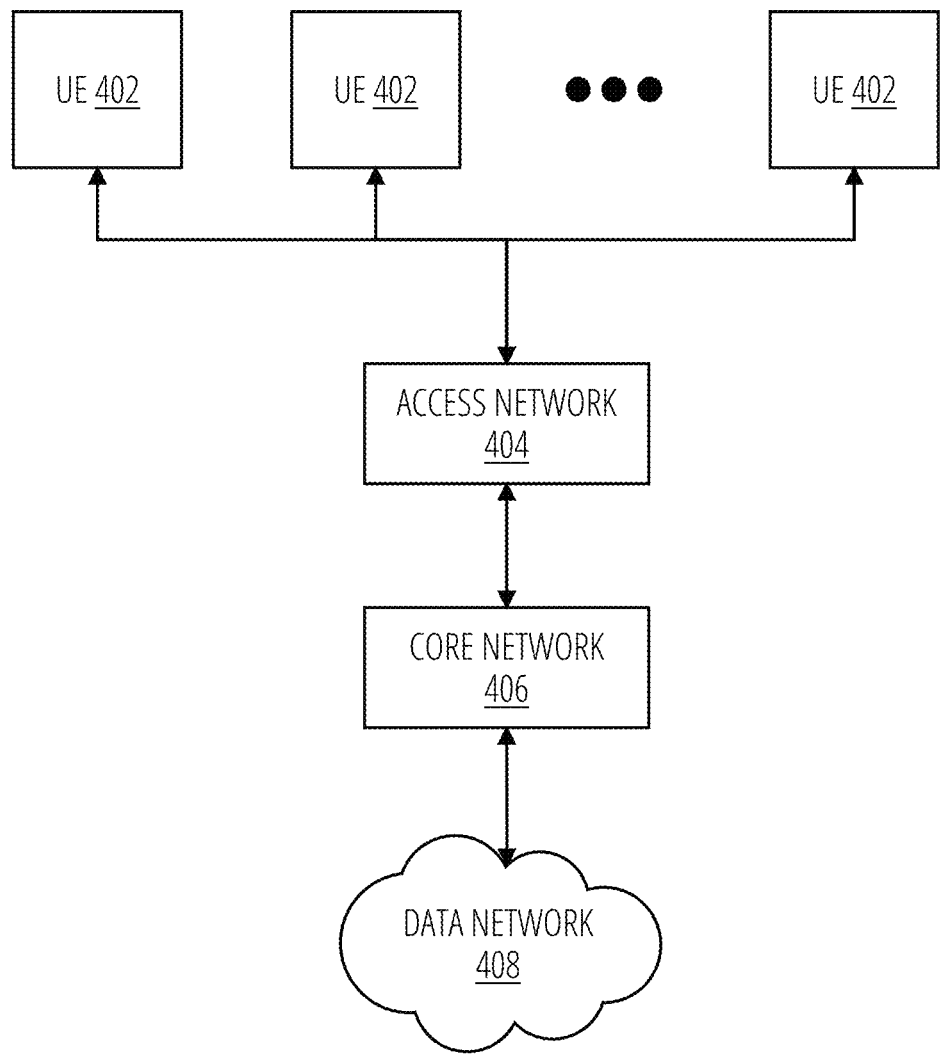
FIG. 4 is a block diagram of an example network architecture according to some embodiments.

FIG. 4 is a block diagram of an example network architecture according to some embodiments.

In the illustrated embodiment, UE 402 can access a data network 408 via an access network 404 and a core network 406. In the illustrated embodiment, UE 402 can comprise any computing device capable of communicating with the access network 404 (e.g., device 500 discussed in relation to FIG. 5). As examples, UE 402 can include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver.

In the illustrated embodiment of FIG. 4, the access network 404 can comprise a network allowing network communication with UE 402. In general, the access network 404 can include at least one base station that is communicatively coupled to the core network 406 and coupled to zero or more UE 402.

In some embodiments, the access network 404 can comprise a cellular access network, for example, a fifth-generation (5G) network or a fourth-generation (4G) network. In one embodiment, the access network 404 can comprise a NextGen Radio Access Network (NG-RAN), which can be communicatively coupled to UE 402. In an embodiment, the access network 404 can include a plurality of base stations (e.g., eNodeB (eNB), gNodeB (gNB)) communicatively connected to UE 402 via an air interface. In one embodiment, the air interface can comprise a New Radio (NR) air interface. For example, in a 5G network, UE 402 can be communicatively coupled to each other, and in some embodiments, for example, such coupling can be via Wi-Fi functionality, Bluetooth, or other forms of spectrum technologies, and the like.

In the illustrated embodiment, the access network 404 can provide the UE 402 access to a core network 406. In the illustrated embodiment, the core network may be owned and/or operated by a service provider or a network operator (NO) and provides wireless connectivity to UE 402 via access network 404. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 402 to elements of the core network 406 and to external network-attached elements in a data network 408 such as, but not limited to, the Internet, a local area network (LAN), a wireless LAN, a wide area network (WAN), a mobile edge computing (MEC) network, a private network, a cellular network, and the like. In some embodiments, network elements may be physical elements such as router, servers and switches or may be virtual Network Functions implemented on physical elements.

In the illustrated embodiment, the access network 404 and the core network 406 may be operated by an NO. However, in some embodiments, the networks (404, 406) may be operated by a private entity, different entities, and the like, and may be closed to public traffic. In these embodiments, the operator of the device can simulate a cellular network, and UE 402 can connect to this network similar to connecting to a national or regional network.

Figure 5:
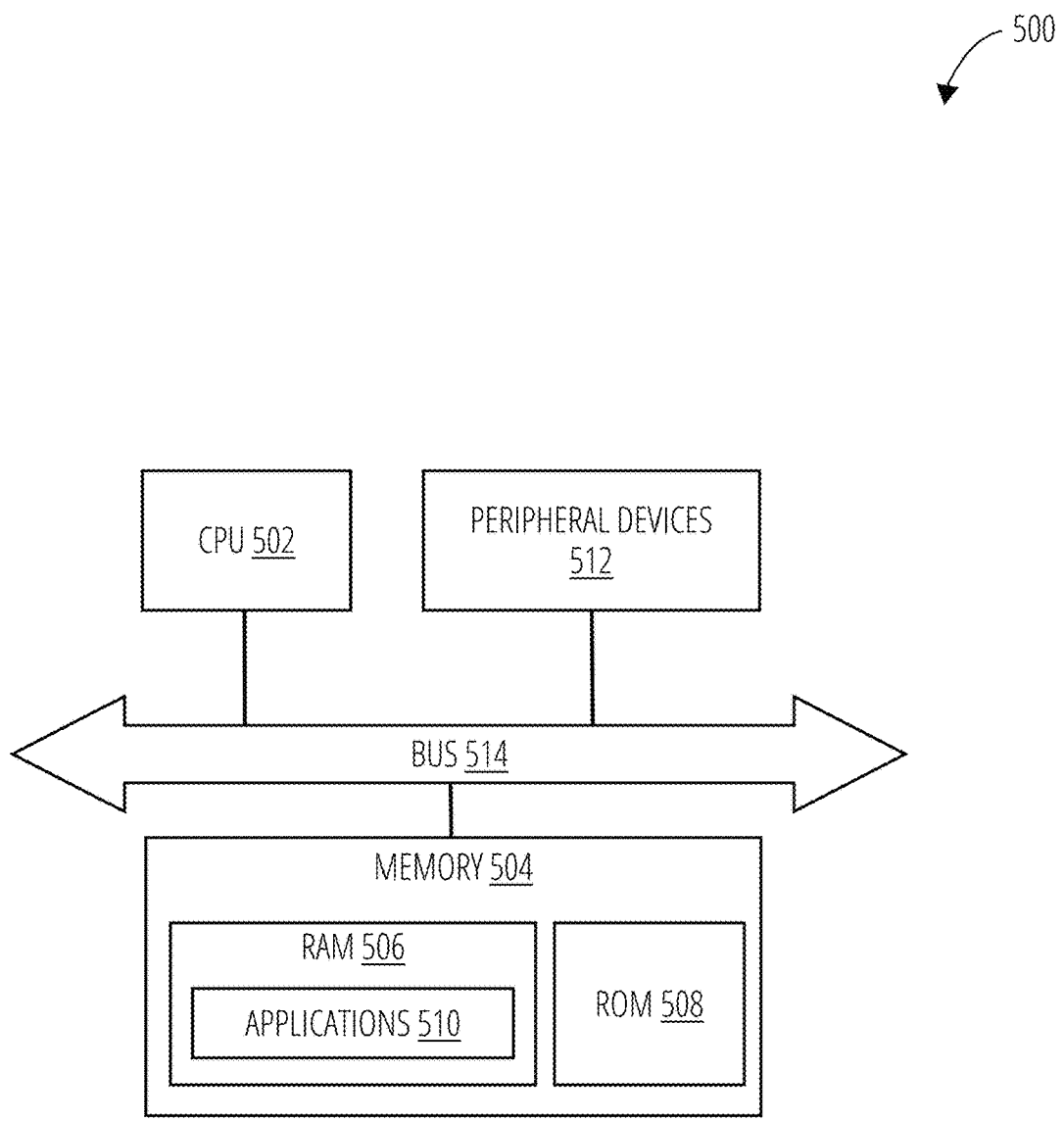
FIG. 5 is a block diagram of a device according to some embodiments.

FIG. 5 is a block diagram of a device according to some embodiments.

As illustrated, the device 500 can include a processor or central processing unit (CPU) such as CPU 502 in communication with a memory 504 via a bus 514. Device 500 can also include one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 can comprise a general-purpose CPU. The CPU 502 can comprise a single-core or multiple-core CPU. The CPU 502 can comprise a system-on-a-chip (SoC) or a similar embedded system. In some embodiments, a graphics processing unit (GPU) can be used in place of, or in combination with, a CPU 502. Memory 504 can comprise a non-transitory memory system including a dynamic random-access memory (DRAM), static random-access memory (SRAM), Flash (e.g., NAND Flash), or combinations thereof. In one embodiment, the bus 514 can comprise a Peripheral Component Interconnect Express (PCIe) bus. In some embodiments, bus 514 can comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device 500 can optionally communicate with a base station (not shown) or directly with another computing device. One or more network interfaces in peripheral devices 512 are sometimes referred to as a transceiver, transceiving device, or network interface card (NIC).

An audio interface in Peripheral devices 512 produces and receives audio signals such as the sound of a human voice. For example, an audio interface may be coupled to a speaker and microphone (not shown) to enable telecommunication with others or generate an audio acknowledgment for some action. Displays in Peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 can comprise any input device arranged to receive input from a user. An illuminator in peripheral devices 512 can provide a status indication or provide light. The device can also comprise an input/output interface in peripheral devices 512 for communication with external devices, using communication technologies, such as USB, infrared, Bluetooth™, or the like. A haptic interface in peripheral devices 512 can provide a tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, by a message aggregator, a message template including an Internet link, wherein the message template includes message content and the Internet link to be sent to one or more recipients;
    obtaining, by the message aggregator, a representative link corresponding to the Internet link;
    compiling, by the message aggregator, a message based on the message template and the representative link, wherein compiling comprises replacing the Internet link in the message template with the representative link, the compiled message including the representative link;
    validating, by the message aggregator, the representative link; and
    transmitting, by the message aggregator, based on whether the representative link is valid, the compiled message including the representative link to a messaging server for delivery to the one or more recipients.

2. The method of claim 1, wherein the Internet link is a Uniform Resource Locator (URL) link.

3. The method of claim 1, wherein the compiled message is a Short Message Service (SMS) message.

4. The method of claim 1, wherein obtaining the representative link comprises:
    transmitting, by the message aggregator to a representative link server, a request to provide the representative link, the request including the Internet link; and
    receiving, by the message aggregator from the representative link server, the representative link.

5. The method of claim 1, wherein validating the representative link comprises:
    transmitting, by the message aggregator to a representative link server, a request to indicate whether the representative link is valid; and
    receiving, by the message aggregator from the representative link server, a response indicating that the representative link is valid.

6. The method of claim 1, wherein the representative link is obtained from a representative link server corresponding to a telecommunications network and wherein the representative link is specific to the network.

7. The method of claim 6, further comprising:
    storing, by the message aggregator, an association between the representative link and the Internet link in a data storage, wherein the association includes an originating identifier of a source of the message template and destination identifiers of the one or more recipients.

8. The method of claim 6, further comprising:
    determining, prior to obtaining the representative link, whether the Internet link exceeds a character limit for the compiled message; and
    when the Internet link exceeds the character limit, generating the representative link with a length that enables the compiled message to comply with the character limit.

9. A non-transitory computer-readable storage medium for storing instructions executable by a processor, the instructions comprising:
    receiving a message template including an Internet link, wherein the message template includes message content and the Internet link to be sent to one or more recipients;
    obtaining a representative link corresponding to the Internet link;
    compiling a message based on the message template and the representative link, wherein compiling comprises replacing the Internet link in the message template with the representative link, the compiled message including the representative link;
    validating the representative link; and
    transmitting, based on whether the representative link is valid, the compiled message including the representative link to a messaging server for delivery to the one or more recipients.

10. The non-transitory computer-readable storage medium of claim 9, wherein the Internet link is a Uniform Resource Locator (URL) link.

11. The non-transitory computer-readable storage medium of claim 9, wherein the compiled message is a Short Message Service (SMS) message.

12. The non-transitory computer-readable storage medium of claim 9, wherein obtaining the representative link comprises:
   transmitting, to a representative link server, a request to provide the representative link the request including the Internet link; and
   receiving, from the representative link server, the representative link.

13. The non-transitory computer-readable storage medium of claim 9, wherein validating the representative link comprises:
   transmitting, to a representative link server, a request to indicate whether the representative link is valid; and
   receiving, from the representative link server, a response indicating that the representative link is valid.

14. The non-transitory computer-readable storage medium of claim 9, wherein the representative link is obtained from a representative link server corresponding to a telecommunications network and wherein the representative link is specific to the network.

15. A device comprising a processor configured to:
   receive a message template including an Internet link, wherein the message template includes message content and the Internet link to be sent to one or more recipients;
   obtain a representative link corresponding to the Internet link;
   compile a Short Message Service (SMS) message based on the message template and the representative link, wherein compiling comprises replacing the Internet link in the message template with the representative link, the compiled message including the representative link;
   validate the representative link; and
   transmit, based on whether the representative link is valid, the compiled message including the representative link to a messaging server for delivery to the one or more recipients.

16. The device of claim 15, wherein the Internet link is a Uniform Resource Locator (URL) link.

17. The device of claim 15, wherein the compiled message is a Short Message Service (SMS) message.

18. The device of claim 15, wherein the processor is configured to obtain the representative link by:
   transmitting, to a representative link server, a request to provide the representative link, the request including the Internet link; and
   receiving, from the representative link server, the representative link.

19. The device of claim 15, wherein the processor is configured to validate the representative link by:
   transmitting, to a representative link server, a request to indicate whether the representative link is valid; and
   receiving, from the representative link server, a response indicating that the representative link is valid.

20. The device of claim 15, wherein the representative link is obtained from a representative link server corresponding to a telecommunications network, wherein the representative link is specific to the network.

* * * * *